(12) United States Patent
Ebe

(10) Patent No.: US 7,802,853 B2
(45) Date of Patent: Sep. 28, 2010

(54) SEAT CUSHION PAD FOR VEHICLE, SEAT BACK PAD FOR VEHICLE, AND SEAT FOR VEHICLE

(75) Inventor: Kazushige Ebe, Findlay, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/819,405

(22) Filed: Jun. 27, 2007

(65) Prior Publication Data

US 2008/0012407 A1      Jan. 17, 2008

Related U.S. Application Data

(63) Continuation of application No. PCT/JP2005/023228, filed on Dec. 19, 2005.

(30) Foreign Application Priority Data

Dec. 28, 2004 (JP) ............... 2004-379868
Aug. 25, 2005 (JP) ............... 2005-244524

(51) Int. Cl.
*A47C 7/02* (2006.01)

(52) U.S. Cl. .................. 297/452.27; 297/452.37; 5/653

(58) Field of Classification Search ............ 297/452.27, 297/452.37; 5/653
See application file for complete search history.

(56) References Cited

U.S. PATENT DOCUMENTS

| | | | | |
|---|---|---|---|---|
| 4,405,681 A | * | 9/1983 | McEvoy | ............... 428/309.9 |
| 4,714,574 A | * | 12/1987 | Tenhagen | ............... 264/45.1 |
| 4,755,411 A | * | 7/1988 | Wing et al. | ............... 428/71 |
| 5,000,515 A | * | 3/1991 | Deview | ............... 297/452.27 |
| 5,105,491 A | * | 4/1992 | Yoshiyuki et al. | ............... 5/655.9 |
| 5,630,240 A | * | 5/1997 | Matsuoka et al. | ............... 5/653 |
| 6,336,681 B1 | * | 1/2002 | Crosbie | ............... 297/452.27 |

(Continued)

FOREIGN PATENT DOCUMENTS

JP      7-206961 A      8/1995

(Continued)

OTHER PUBLICATIONS

Chinese Office Action dated Dec. 4, 2009.

(Continued)

*Primary Examiner*—Laurie K Cranmer
(74) *Attorney, Agent, or Firm*—Sughrue Mion, PLLC

(57) ABSTRACT

A seat cushion pad for a vehicle and a seat back pad for a vehicle, which produce no discomfort between seat comfort of an under-buttock section and a backrest section and that of the other sections, are provided. A part of or entire seating surface except the under-buttock section of the seat cushion pad is composed of a material Q having a density lower than the density of a material P constituting the under-buttock section. The 25% hardness based on a hardness testing method specified in JASO-B408 of the material Q is smaller than the 25% hardness of the material P. A part of or entire sections except the backrest section of the seat back pad are composed of a material S having a density lower than the density of a material R. The 25% hardness based on a hardness testing method specified in JASO-B408 of the material S is softer than the 25% hardness of the material R.

16 Claims, 7 Drawing Sheets

U.S. PATENT DOCUMENTS

| | | | | |
|---|---|---|---|---|
| 6,450,572 B1 | * | 9/2002 | Kuipers | 297/195.1 |
| 6,571,411 B1 | * | 6/2003 | Ebe | 5/653 |
| 7,040,707 B2 | * | 5/2006 | Nakahara | 297/452.27 |

FOREIGN PATENT DOCUMENTS

| | | |
|---|---|---|
| JP | 07-206961 A | 8/1995 |
| JP | 2000189289 A | 7/2000 |
| JP | 2001-070083 A | 3/2001 |
| JP | 2001-70083 A | 3/2001 |
| JP | 2002153357 | 5/2002 |
| WO | WO 2004058473 A1 * | 7/2004 |

OTHER PUBLICATIONS

Chinese Office Action dated Apr. 19, 2010.

* cited by examiner

Fig. 10a LOAD-DEFLECTION DIAGRAM (∅ 200)

PRESSURE PROBE

SEAT CUSHION PAD FOR VEHICLE, SEAT BACK PAD FOR VEHICLE, AND SEAT FOR VEHICLE

CROSS REFERENCE TO RELATED APPLICATION

This is a continuation application of PCT/JP2005/23228 filed on Dec. 19, 2005.

TECHNICAL FIELD

The present invention relates to a seat cushion pad for a vehicle and a seat back pad for a vehicle. In particular, the present invention relates to a seat cushion pad for a vehicle and a seat back pad for a vehicle which are intended to facilitate weight reduction and cost reduction without impairing the seat comfort, the ride comfort, and the durability. Furthermore, the present invention relates to a seat for a vehicle provided with the above-described seat cushion pad or the seat back pad.

BACKGROUND ART

A seat cushion pad disposed in a seating section of a seat of an automobile or the like has been composed of an under-buttock section, an under-thigh section, side bulging sections on both sides of the seating surface, and a rear end section, and has been produced by injecting an urethane formulation stock solution, which is produced by mixing a polyol component formulation solution and an isocyanate component, into a mold, followed by foam molding. Likewise, a seat back pad disposed in a backrest section has been composed of an upper backrest section, a lower backrest section, side bulging sections on both sides thereof, an upper end section, and a lower end section, and has been produced in a similar manner.

In the seat cushion pad and the seat back pad for a vehicle, sections in direct contact with the buttock section and the back of an occupant, for example, the under-buttock section of the seating surface, are applied with most of the occupant's weight, and materials for these sections have a close bearing on the seat comfort and ride comfort. Therefore, the constituent materials of the under-buttock section and the like are important from the view point of the seat comfort and the ride comfort. However, the other sections are applied with a small load of the weight and, therefore, the importance is relatively low.

In order to facilitate weight reduction and cost reduction of the seat cushion pad for a vehicle, various improved seat cushion pads for a vehicle have been proposed, in which, for example, an under-buttock section of a seating surface having a largest influence on the seat comfort has been made a high-density section, and the other sections have been made low-density sections.

Japanese Unexamined Patent Application Publication No. 2002-153357 has proposed a seat cushion pad for a vehicle in which a part of or entire seating surface except an under-buttock section has been made to have a density lower than the density of the under-buttock section and a hardness nearly equal to the hardness of the under-buttock section.

It has been proposed that "the 25% hardnesses" defined in JASO-B408 are allowed to agree with each other in order to match the feeling (feeling in seating) about the under-buttock section and the feeling about the other sections with each other. However, in the method for measuring the 25% hardness, a large disk having a diameter of 200 mm is used and, in addition, a value of reaction force is read after the 25% compression is kept for 20 seconds. Therefore, even when the 25% hardnesses are allowed to agree with each other, the feeling about the foam of the under-buttock section is different from the feeling about the foam of the other sections, because different formulations are used. Consequently, the discomfort is produced between the feelings.

As an example thereof, FIG. 10a shows load-deflection diagrams and stress relaxation after keeping for 20 seconds during measurement of the 25% hardness of two types of urethane foam having an equal 25% hardness of 314 N. FIG. 10b is a diagram showing a magnified stress relaxation portion.

As shown in FIGS. 10a and 10b, even when the 25% hardnesses are equal, the amounts of stress relaxation are different and the reaction forces of load-deflection curves before keeping for 20 seconds are different depending on the formulations.

In order to attain the same 25% hardness, a resin in the urethane foam having a low-density urethane formulation (C) must be made harder. In general, a harder resin exhibits a larger amount of stress relaxation. Therefore, the reaction force before keeping for 20 seconds of the urethane foam having a low-density formulation (C) is higher than that of the urethane foam having a high-density formulation (D) by about 7 N. As a result, at the instant when being pushed, the urethane foam having the formulation C produces a harder feeling.

With respect to the low density, high hardness urethane, the resin itself is harder than the resin of the high-density urethane having the same level of hardness. Therefore, the tension of the pad surface portion is high and a taut and hard feeling is produced as compared with a soft, elastic, and high-density urethane. Even when the 25% hardnesses are equal, the difference therebetween becomes evident by pressing the foam with a finger or the like having a small area.

FIG. 11 shows a load-deflection diagram when the formulation C and the formulation D having an equal 25% hardness are pressed with a disk having a diameter of 10 mm. The low-density, hard formulation C exhibits a compressive load (reaction force) about 40% higher than that of the high-density formulation D. This indicates that since such a difference is exhibited by pressing with the disk having a diameter close to the thickness of a finger, the formulation C feels harder to the touch with a hand even when the 25% hardnesses are equal.

The thighs and hands rather than the buttock are mainly brought into contact with the under-thigh section and side bulging sections in seating. These sections have contact areas smaller than that of the under-buttock section, and loads to be applied are also small. Therefore, pressing with a smaller disk rather than pressing with a disk having a diameter of 200 mm is suitable for matching the feeling about them with the feeling about the under-buttock section because a produced feeling is close to an actual feeling.

Likewise, in the case where these two types of urethane foam are pressed with a pressure probe 131 at the front end of a push-pull gauge 130 shown in FIG. 12a, the values of the formulation C and the formulation D are 17.5 N and 13.7 N, respectively. Therefore, the formulation C exhibits a higher value and becomes harder. Since this pressure probe 130 is pressed into a sample by 15 mm so as to measure the reaction force, as shown in FIGS. 12(b) and 12(c), the front end side of the pressure probe 131 is in the shape of a hemisphere having a diameter of 20 mm.

As described above, in the case where different materials are used for the under-buttock section and the other sections, e.g., the under-thigh section and the side bulging sections, the feelings about the foams cannot be matched with each other simply by allowing the 25% hardnesses defined in JASO-B408 (JIS K 6401) to agree with each other, and uncomfortable feelings are produced among the formulations.

DISCLOSURE OF INVENTION

It is an object of the present invention to provide a seat cushion pad for a vehicle and a seat back pad for a vehicle, which produce no discomfort between seat comfort of center sections, e.g., an under-buttock section and a backrest section, and that of the periphery sections.

In a seat cushion pad for a vehicle according to a first aspect of the present invention, a part of or entire seating surface except an under-buttock section is composed of a material Q having a density lower than the density of a material P constituting the under-buttock section. The 25% hardness based on a hardness testing method specified in JASO-B408 (hereafter referred to as 25% hardness) of the material Q is smaller than the 25% hardness of the material P.

In a seat back pad for a vehicle according to a second aspect of the present invention, a part of or entire sections except a backrest section are composed of a material S having a density lower than the density of a material R constituting the backrest section. The 25% hardness based on a hardness testing method specified in JASO-B408 of the material S is softer than the 25% hardness of the material R.

In the present invention, the density refers to "an OA density (overall density; general density)".

In the present invention, the 25% hardnesses of at least a part of (preferably, entire) sections other than the under-buttock section or the backrest section are specified to be slightly smaller than the 25% hardness of the under-buttock section or the backrest section. In this manner, the foam feelings about the under-buttock section or the backrest section and about the other sections are brought close to each other, and it becomes possible to produce a pad which does not feel discomfort.

Consequently, according to the present invention, a seat cushion pad for a vehicle and a seat back pad for a vehicle are provided, wherein weight reduction and cost reduction are facilitated without impairing the seat comfort, the ride comfort, and the durability, and the seat cushion pad for a vehicle and the seat back pad for a vehicle are prevented from producing discomfort between the under-buttock section or the backrest section and the other sections. Furthermore, according to the application of the present technology, the hardnesses and material properties of sections other than the under-buttock section can be intentionally controlled relative to those of the under-buttock section. Most of all, optimum hardnesses of the under-buttock section and the under-thigh section can be selected independently, whereas it has been impossible for a known product of single formulation or having side sections composed of different materials. Consequently, the ride comfort can also be improved.

BRIEF DESCRIPTION OF THE DRAWINGS

FIGS. 10a and 10b are graphs showing load (N)-strain (%) curves of urethane having known formulations.

BEST MODE FOR CARRYING OUT THE INVENTION

The embodiments of the seat cushion pad for a vehicle and the seat back pad for a vehicle according to the present invention will be described below in detail with reference to the drawings.

FIGS. 1 to 5 are perspective views, each showing an embodiment of the seat cushion pad for a vehicle according to the present invention. FIGS. 6 to 9 are perspective views, each showing an embodiment of the seat back pad for a vehicle according to the present invention.

Figure 1:
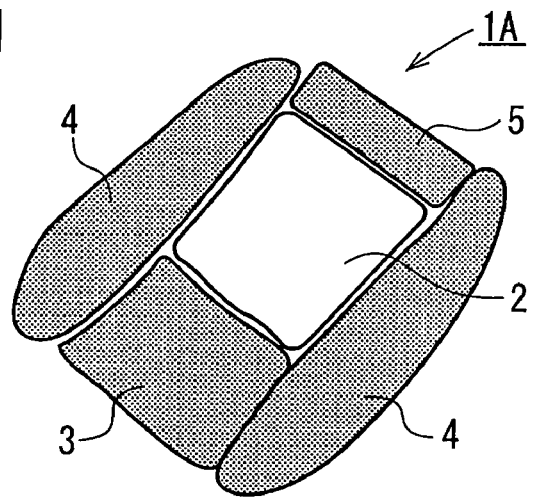
FIG. 1 is a perspective view showing an embodiment of a seat cushion pad for a vehicle according to the present invention.
Figure 13:
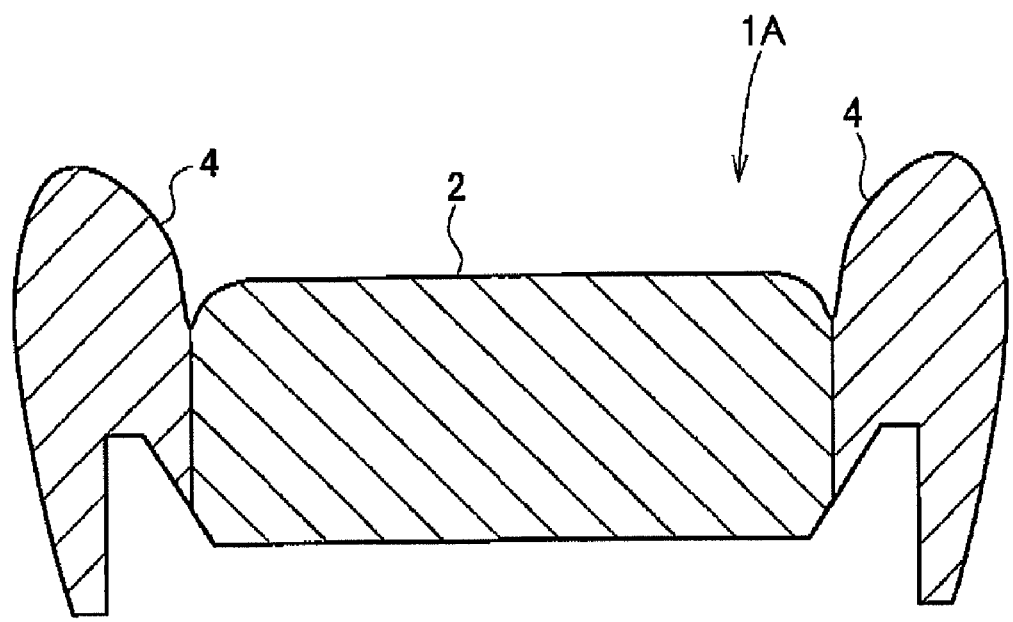
FIG. 13 is a cross-sectional view of the seat cushion portion of FIG. 1A.

In a seat cushion pad 1A for a vehicle, as shown in FIG. 1, an under-buttock section 2 is simply a high-density section, and the other sections, an under-thigh section 3, side bulging sections 4, and a rear end section 5, are low-density sections. As shown in the cross-sectional view of FIG. 13, the under-buttock section 2 extends from the top surface of the seat cushion to the bottom surface thereof.

Figure 2:
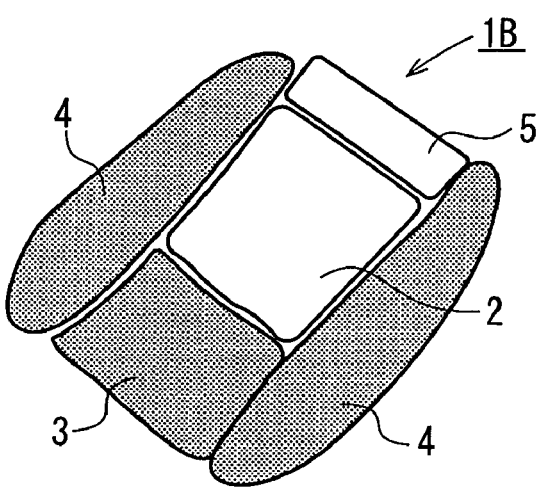
FIG. 2 is a perspective view showing another embodiment of a seat cushion pad for a vehicle according to the present invention.

In a seat cushion pad 1B for a vehicle, as shown in FIG. 2, an under-buttock section 2 and a rear end section 5 are high-density sections, and an under-thigh section 3 and side bulging sections 4 are low-density sections.

Figure 3:
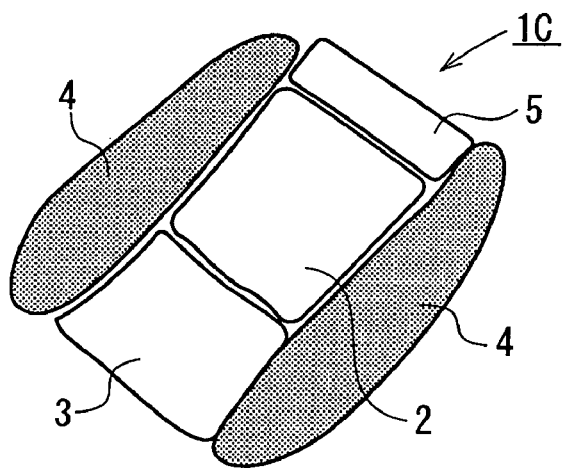
FIG. 3 is a perspective view showing another embodiment of a seat cushion pad for a vehicle according to the present invention.

In a seat cushion pad 1C for a vehicle, as shown in FIG. 3, side bulging sections 4 are simply low-density sections, and the other sections, an under-buttock section 2, an under-thigh section 3, and a rear end section 5, are high-density sections.

Figure 4:
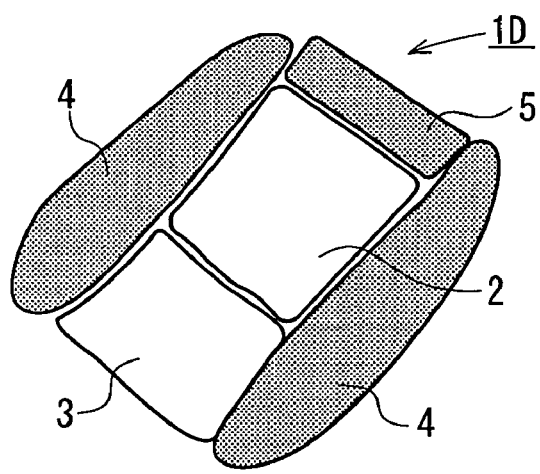
FIG. 4 is a perspective view showing another embodiment of a seat cushion pad for a vehicle according to the present invention.

In a seat cushion pad 1D for a vehicle, as shown in FIG. 4, an under-buttock section 2 and an under-thigh section 3 are high-density sections, and side bulging sections 4 and a rear end section 5 are low-density sections.

Figure 5:
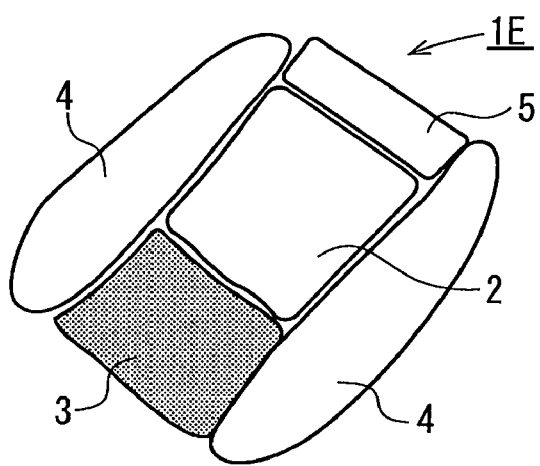
FIG. 5 is a perspective view showing another embodiment of a seat cushion pad for a vehicle according to the present invention.

In a seat cushion pad 1E for a vehicle, as shown in FIG. 5, an under-thigh section 3 is simply a low-density section, and the other sections, an under-buttock section 2, side bulging sections 4, and a rear end section 5, are high-density sections.

Figure 6:
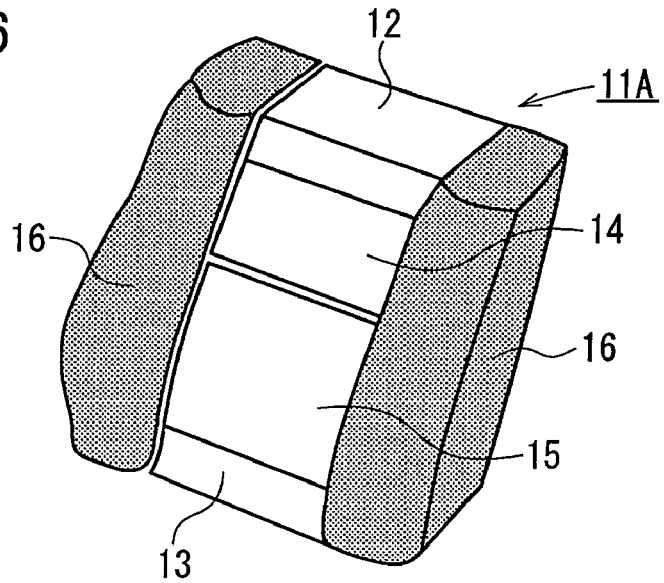
FIG. 6 is a perspective view showing an embodiment of a seat back pad for a vehicle according to the present invention.

In a seat back pad 11A for a vehicle, as shown in FIG. 6, side bulging sections 16 are simply low-density sections, and the other sections, an upper end section 12, a lower end section 13, an upper backrest section 14, and a lower backrest section 15, are high-density sections.

Figure 7:
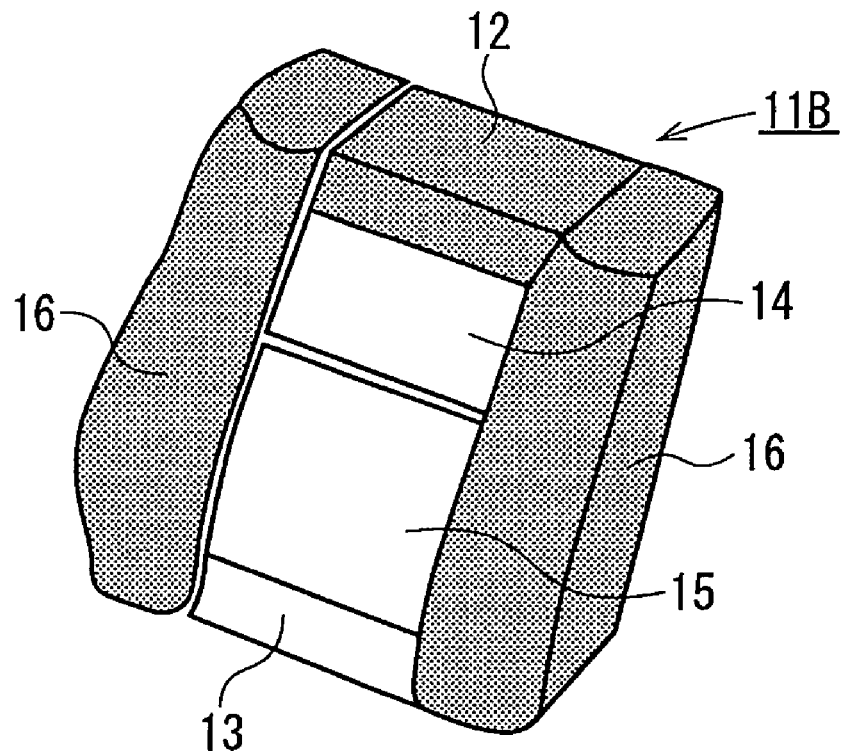
FIG. 7 is a perspective view showing another embodiment of a seat back pad for a vehicle according to the present invention.

In a seat back pad 11B for a vehicle, as shown in FIG. 7, side bulging sections 16 and an upper end section 12 are low-density sections, and the other sections, a lower end section 13, an upper backrest section 14, and a lower backrest section 15, are high-density sections.

Figure 8:
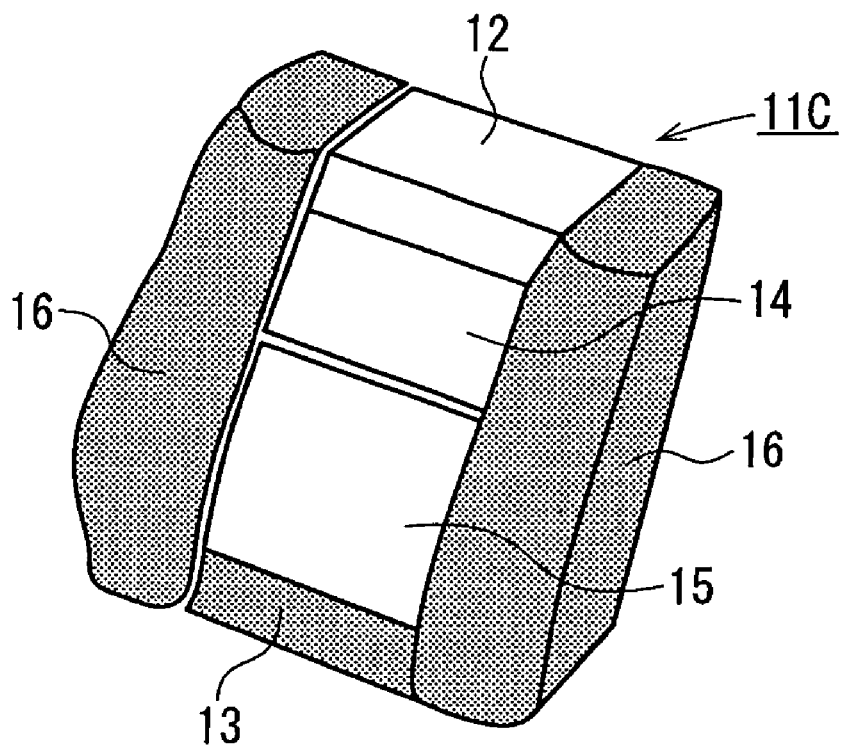
FIG. 8 is a perspective view showing another embodiment of a seat back pad for a vehicle according to the present invention.

In a seat back pad 11C for a vehicle, as shown in FIG. 8, side bulging sections 16 and a lower end section 13 are low-density sections, and the other sections, an upper end section 12, an upper backrest section 14, and a lower backrest section 15, are high-density sections.

Figure 9:
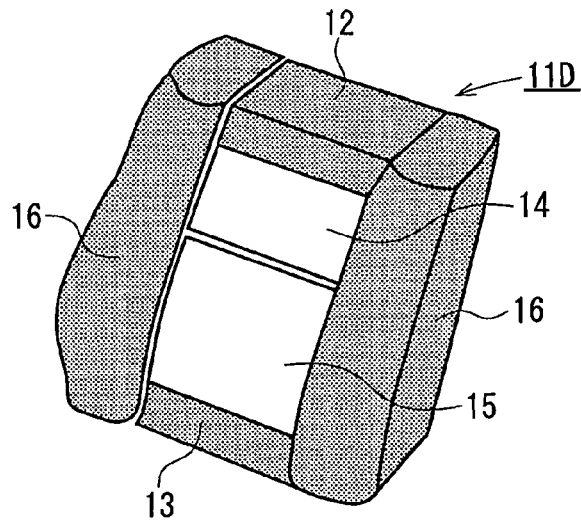
FIG. 9 is a perspective view showing another embodiment of a seat back pad for a vehicle according to the present invention.
Figure 9:
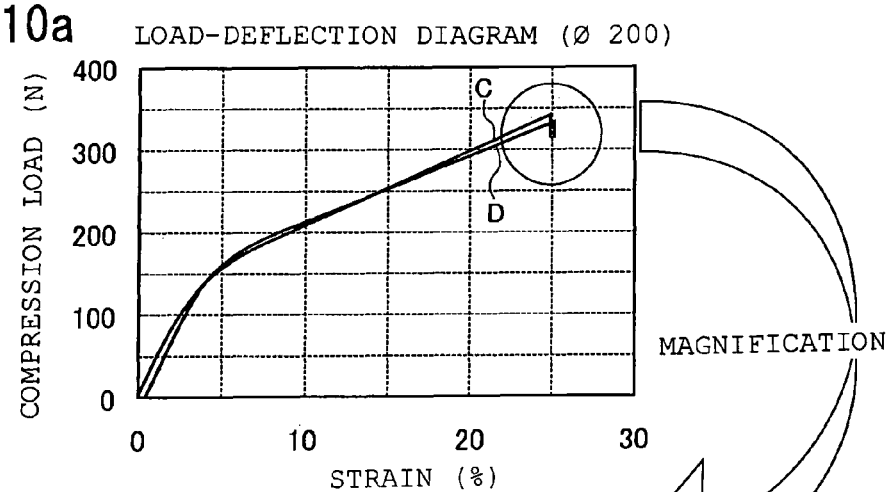
Figure 10B:
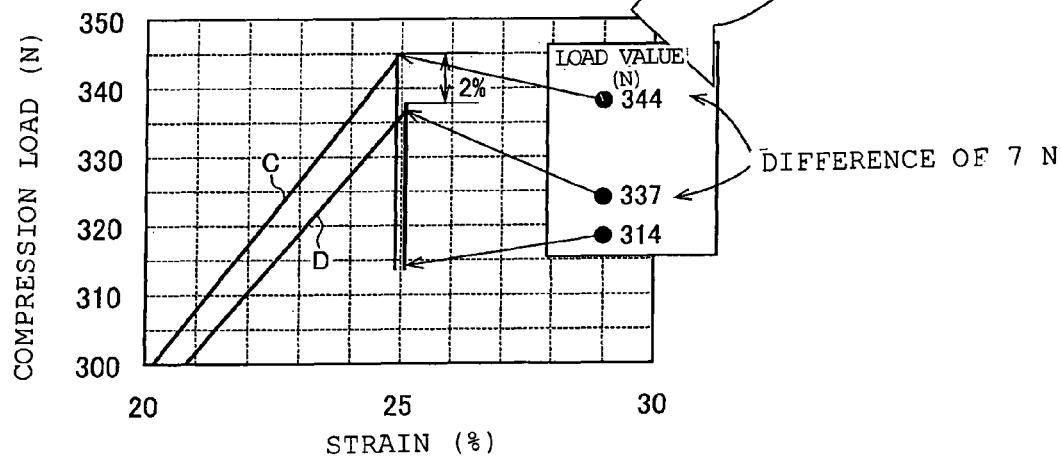
Figure 11:
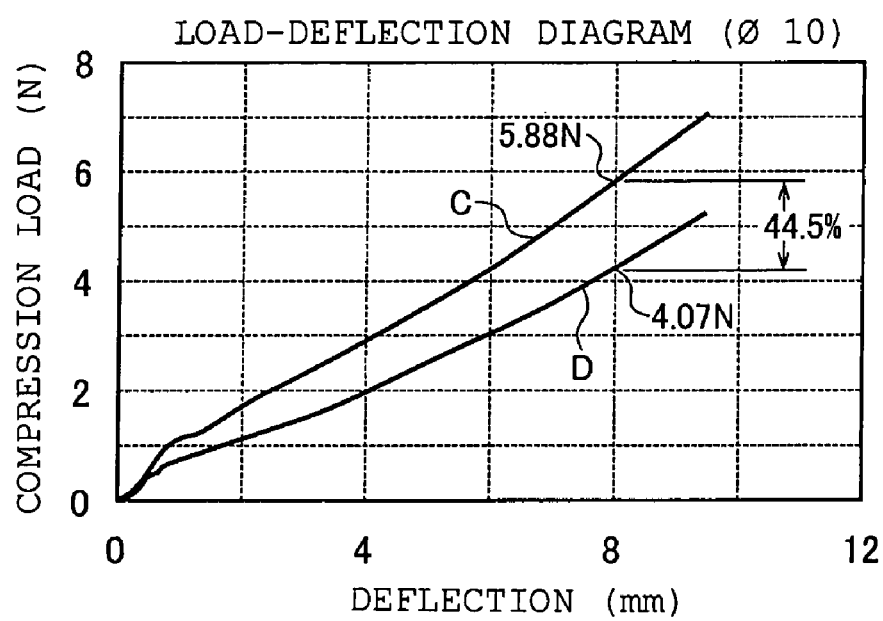
FIG. 11 is a graph showing load (N)-strain (%) curves of urethane having known formulations.
Figure 12A:
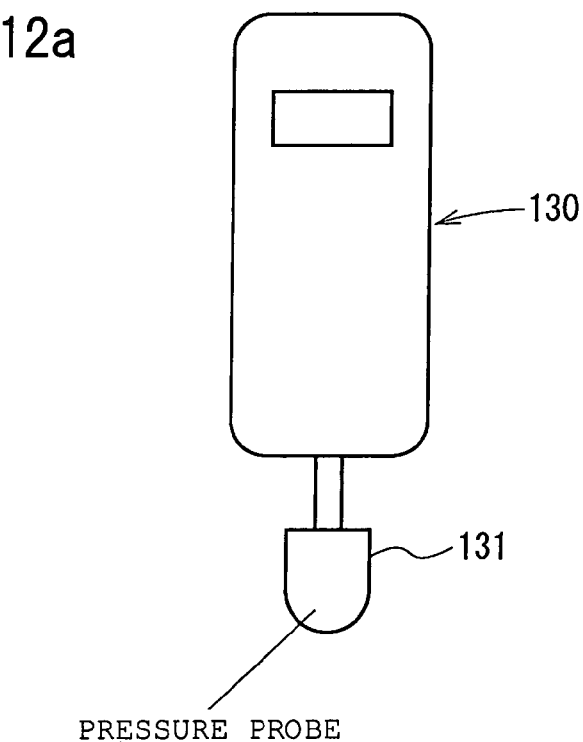
FIGS. 12a, 12b, and 12c are explanatory diagrams of a method for measuring a hardness with a push-pull gage.
Figure 12B:
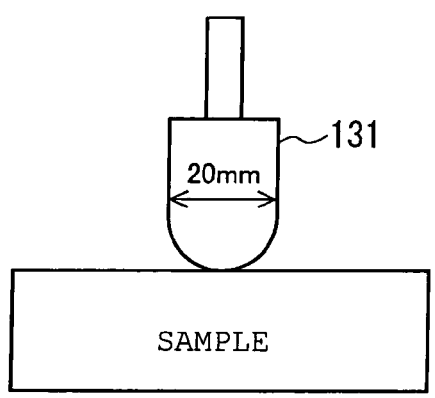
Figure 12C:
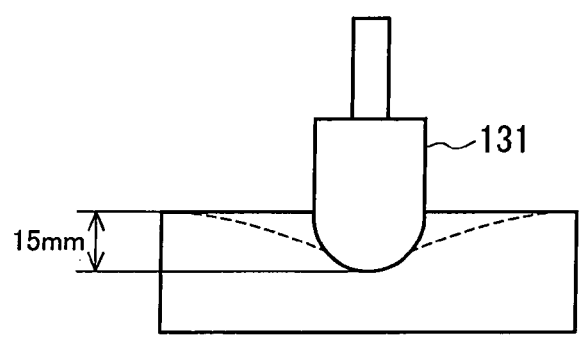

In a seat back pad 11D for a vehicle, as shown in FIG. 9, side bulging sections 16, an upper end section 12, and a lower end section 13 are low-density sections, and the other sections, an upper backrest section 14 and a lower backrest section 15, are high-density sections.

In the present invention, preferably, the density $D_A$ of the high-density section is about 40 to 80 kg/m³ in order to ensure the seat comfort, the ride comfort, the durability, and the like. Preferably, the hardness $H_A$ is about 150 to 300 N.

On the other hand, preferably, the density $D_B$ of the low-density section is about 40% to 95% of the density $D_A$ of the high-density section in order to facilitate weight reduction.

This high-density section is formed by foam molding an urethane formulation stock solution A, and the low-density section is formed by foam molding an urethane formulation stock solution B. The high-density section composed of the urethane formulation stock solution A and the low-density section composed of the urethane formulation stock solution B can be produced as in the following items [I] and [II].

[I] The urethane formulation stock solution A, which exhibits a hardness of $H_{XA}$ when being foam molded in such a way that the density becomes $D_X$ (where $D_A > D_X > D_B$), is used for the high-density section. This urethane formulation stock solution A is foam molded in such a way that the density becomes $D_A$. On the other hand, the urethane formulation stock solution B prepared by increasing the isocyanate index of an urethane formulation stock solution B', which exhibits a hardness of $H_{XB'}$ higher than the hardness of $H_{XA}$ when being foam molded in such a way that the density becomes $D_X$ (where $D_A > D_X > D_B$), is used for the low-density section. This urethane formulation stock solution B is foam molded in such a way that the density becomes $D_B$.

It is preferable that the isocyanate indices of the urethane formulation stock solution A and the urethane formulation stock solution B' to be foam molded to have a density $D_X$ are at the same level. Preferably, the isocyanate indices of the two are about 80 to 120. Preferably, the urethane formulation stock solution B' having an equal density and a high hardness as compared with those of the urethane formulation stock solution A exhibits the hardness of $H_{XB'}$ 1.1 times or more, for example, 1.2 to 2.0 times the hardness of $H_{XA}$ of the urethane formulation stock solution A.

The urethane formulation stock solution B is prepared by increasing the isocyanate index of the urethane formulation stock solution B' by about 1 to 20 in such a way that the hardness of $H_B$ can be attained at a density of $D_B$. In order to increase the isocyanate index, it is simple to adjust the blending ratio of the polyol component formulation solution and the isocyanate component in the urethane formulation stock solution B' so as to increase the isocyanate component.

[II] For the high-density section, the urethane formulation stock solution A prepared by decreasing the isocyanate index of an urethane formulation stock solution A', which exhibits a hardness of $H_{XA'}$ when being foam molded in such a way that the density becomes $D_X$ (where $D_A > D_X > D_B$), is foam molded in such a way that the density becomes $D_A$. On the other hand, for the low-density section, the urethane formulation stock solution B prepared by increasing the isocyanate index of the urethane formulation stock solution B', which exhibits a hardness of $H_{XB'}$ higher than the hardness of $H_{XA'}$ when being foam molded in such a way that the density becomes $D_X$ (where $D_A > D_X > D_B$), is used, and this urethane formulation stock solution B is foam molded in such a way that the density becomes $D_B$.

It is preferable that the isocyanate indices of the urethane formulation stock solution A' and the urethane formulation stock solution B' to be foam molded to have a density $D_X$ are at the same level. Preferably, the isocyanate indices of the two are about 80 to 120. Preferably, the urethane formulation stock solution B' having an equal density and a high hardness as compared with those of the urethane formulation stock solution A' exhibits the hardness of $H_{XB'}$ 1.1 times or more, for example, 1.2 to 2.0 times the hardness of $H_{XA'}$ of the urethane formulation stock solution A'.

The urethane formulation stock solution A is prepared by decreasing the isocyanate index of the urethane formulation stock solution A' by about 1 to 20, preferably about 2 to 10, in such a way that the hardness of $H_A$ is attained at a density of $D_A$. The urethane formulation stock solution B is prepared by increasing the isocyanate index of the urethane formulation stock solution B' by about 1 to 20, preferably about 2 to 10, in such a way that the hardness of $H_B$ is attained at a density of $D_B$. In order to decrease the isocyanate index, it is simple to adjust the blending ratio of the polyol component formulation solution and the isocyanate component in the urethane formulation stock solution A' so as to decrease the isocyanate component. Furthermore, in order to increase the isocyanate index, it is simple to adjust the blending ratio of the polyol component formulation solution and the isocyanate component in the urethane formulation stock solution B' so as to increase the isocyanate component.

In this manner, the low-density section is constructed by adjusting the isocyanate index as well as by adjusting the density of the urethane formulation stock solution B' having a high hardness at an equal density of $D_X$ and exhibiting a brittle behavior as compared with those of the urethane formulation stock solution A or the urethane formulation stock solution A'. The index of the formulation stock solution B' is increased in the case of item [I], the index of the formulation stock solution A' is decreased in the case of item [II] and, thereby, it is intended to increase the difference in density between the high-density section and the low-density section and further improve a weight reduction effect of the pad product. Since there is a difference in hardness between the formulation stock solutions A' and B' at the same density, the index can be selected freely within the bounds of the indices being equal or the weight reduction of the product being facilitated.

In the present invention, as described above, the 25% hardness of the material Q is specified to be slightly smaller than the 25% hardness of the material P. Preferably, the 25% hardness of the material Q is specified to be 50% to 98% of the 25% hardness of the material P, and in particular, 60% to 90% is preferable. Furthermore, the 25% hardness of the material S is specified to be slightly smaller than the 25% hardness of the material R. Preferably, the 25% hardness of the material S is specified to be 50% to 98% of the 25% hardness of the material R, and in particular, 60% to 90% is preferable.

Each of FIGS. 1 to 5 shows an example of the embodiment of the seat cushion pad for a vehicle according to the present invention. The present invention is not limited to those shown in the drawings as long as deviation from the gist of the invention does not occur. With respect to the seat cushion pad for a vehicle according to the present invention, it is essential that the under-buttock section is the high-density section, the side bulging sections and/or the under-thigh section are the low-density sections, and the above-described relationship between the 25% hardnesses is satisfied.

Each of FIGS. 6 to 9 shows an example of the seat back pad for a vehicle according to the present invention. The present invention is not limited to those shown in the drawings as long as deviation from the gist of the invention does not occur. With respect to the seat back pad for a vehicle according to the present invention, it is essential that the upper and the lower backrest sections are the high-density sections, the side bulging sections are the low-density sections, the above-described relationship between the 25% hardnesses is satisfied.

In the present invention, it is preferable that 20 to 70% of the total volume of the seat cushion pad or the seat back pad is the high-density section and the remainder is the low-density section in order to satisfactorily facilitate weight reduction and cost reduction without impairing the seat comfort, the ride comfort, and the durability.

The present technology can be combined with a so-called side different-hardness technology, in which a high hardness material is used for the side section, and when being applied to a front cushion, it is preferable that a high hardness formulation is used for the side section, a formulation taking account of the riding comfort is used for the under-buttock section, and a material having a density and a hardness lower than those of the under-buttock section is used for the other sections.

Each of the above-described embodiments is an example of application of the present invention to a single seat, that is, a so-called separate type seat. However, the present invention can also be applied to at least a double seat, that is, a so-called bench type seat.

EXAMPLES

The present invention will be more specifically described below with reference to Example and Comparative examples.

Example 1

A polyol component formulation solution C having a formulation shown in the following Table 1 was used for the side section, the under-thigh section, and the rear end section, and "Cornate T-80" produced by NIPPON POLYURETHANE INDUSTRY CO., LTD., was used as an isocyanate component. These were mixed in such a way that the isocyanate index became 85, so that an urethane formulation stock solution was prepared.

Separately, a polyol component formulation solution D having a formulation shown in the following Table 1 was used, and the same "Cornate T-80" produced by NIPPON POLYURETHANE INDUSTRY CO., LTD., as that described above was used as an isocyanate component. These were mixed in such a way that the isocyanate index became 100, so that an urethane formulation stock solution was prepared.

TABLE 1

|  |  | Polyol component formulation solution C | Polyol component formulation solution D |
|---|---|---|---|
| Formulation ratio (parts by weight) | Polyol (produced by Asahi Glass Co., Ltd.) "EL828" | 58 | 50 |

TABLE 1-continued

|  | Polyol component formulation solution C | Polyol component formulation solution D |
|---|---|---|
| Cross-linking agent (produced by Asahi Glass Co., Ltd.) "EL981" | 2 | 3 |
| Polymer polyol (produced by Sanyo Chemical Industries, Ltd.) "KC827" | 40 | 47 |
| Catalyst (produced by Tosoh Corporation) "TEDAL 33" | 0.5 | 0.9 |
| Foam stabilizer (produced by Toray Industries, Ltd.) "BY10-304" | 1.0 | 0.7 |
| Foaming agent Water | 3.3 | 2.5 |

The above-described urethane formulation stock solutions C and D were supplied in such a way that the densities of the side bulging sections, the under-thigh section, and the rear end section became 56 kg/m$^3$ and the density of the under-buttock section became 66 kg/m$^3$, so as to form seat cushion pads for a vehicle following a common method.

The density and the 25% hardness of the under-buttock section, and the densities and the 25% hardnesses of the side bulging sections, the under-thigh section, and the rear end section of this seat cushion pad for a vehicle are shown in Table 2.

With respect to this seat cushion pad for a vehicle, a monitor seated actually and evaluated the discomfort about the thigh section at that time. The results are shown in Table 2. Each evaluation is expressed as ordinary, not good, or good on a basis of the criteria.

In the present Example, each of the hardnesses of the formulations C and D was in terms of the value in the shape of a test piece of 400×400×100 mm. However, in the case where the check is performed with an actual shape of the product, samples having the same shape may be cut from the under-buttock section and a section other than the under-buttock section, and the LCD hardnesses (compression load deflection hardnesses JIS K 6400-2) may be substituted therefor.

Comparative Example 1

A seat cushion pad for a vehicle was produced as in Example 1 except that all sections were produced by using the same polyurethane formulation as the stock solution of the under-buttock section in Example 1. That is, the formulation D was used as the polyol formulation solution, and the isocyanate index was set at 100. All densities of the under-buttock section and the other sections were adjusted at 66 kg/m$^3$. The results are shown in Table 2.

Comparative Example 2

A seat cushion pad for a vehicle was produced as in Example 1 except that the polyol formulation solution C was used for the side bolster, the under-thigh section, and the rear end section and a higher hardness urethane formulation having an isocyanate index of 100 was used. The evaluation was performed similarly. The results are shown in Table 2.

TABLE 2

| | Under-buttock section | | | | Side bolster, under-thigh section, and rear end section | | | | Product weight (g) | Discomfort about side section and thigh section |
| --- | --- | --- | --- | --- | --- | --- | --- | --- | --- | --- |
| Case | Raw material | ISO Index | Density (kg/m³) | 25% ILD Hardness * (N/200φ) | Raw material | ISO Index | Density (kg/m³) | 25% ILD Hardness * (N/200φ) | | |
| Example 1 | Formulation D | 100 | 66 | 265 | Formulation C | 90 | 56 | 208 | 1145 | good |
| Comparative example 1 | Formulation D | 100 | 66 | 265 | Formulation D | 100 | 66 | 265 | 1255 | ordinary |
| Comparative example 2 | Formulation D | 100 | 66 | 265 | Formulation C | 100 | 56 | 265 | 1145 | not good |

* in terms of 25% hardness of test block of 400' 400' 100 mm

As is clear from Table 2, in Example 1 in which the ratio of the 25% ILD hardness of under-thigh section to the 25% ILD hardness of under-buttock section was adjusted at 78%, no discomfort was produced about the thigh section and good seat comfort was produced as compared with Comparative examples 1 and 2, in which the ratio was adjusted at 100%. Furthermore, the weight in Example 1 is reduced as compared with the weight in Comparative example 1.

The invention claimed is:

1. A seat cushion pad for a vehicle, characterized in that a part of or entire seating surface except an under-buttock section comprises a material Q having a density lower than the density of a material P constituting the under-buttock section,
    wherein a 25% hardness based on a hardness testing method specified in JASO-B408 (hereafter referred to as 25% hardness) of the material Q is softer than a 25% hardness of the material P,
    wherein the 25% hardness of the material Q is 60% to 90% of the 25% hardness of the material P, and
    in cross-section, the under-buttock section extends from a top surface of the seat cushion pad, upon which a user will sit, to a bottom surface of the seat cushion pad.

2. A seat for a vehicle comprising the seat cushion pad for a vehicle according to claim 1.

3. A seat cushion pad for a vehicle according to claim 1, wherein the density of material P is 40 to 80 kg/m³ and the density of material Q is 40% to 95% of the density of material P.

4. A seat back pad for a vehicle according to claim 1, wherein the 25% hardness of material P is 150 to 300 N.

5. A seat back pad for a vehicle, characterized in that a part of or entire sections except a backrest section comprise a material S having a density lower than the density of a material R constituting the backrest section,
    wherein a 25% hardness based on a hardness testing method specified in JASO-B408 of the material S is softer than a 25% hardness of the material R,
    wherein the 25% hardness of the material S is 60% to 90% of the 25% hardness of the material R, and
    in cross-section, the backrest section extends from a top surface of the seat back pad, which will contact the back of a user, to a bottom surface of the seat back pad.

6. A seat for a vehicle comprising the seat cushion pad for a vehicle according to claim 5.

7. A seat cushion pad for a vehicle according to claim 5, wherein the density of material R is 40 to 80 kg/m³ and the density of material S is 40% to 95% of the density of material R.

8. A seat back pad for a vehicle according to claim 5, wherein the 25% hardness of material R is 150 to 300 N.

9. A seat cushion pad for a vehicle, characterized in that a part of or entire seating surface except an under-buttock section comprises a material Q having a density lower than the density of a material P constituting the under-buttock section,
    wherein a 25% hardness based on a hardness testing method specified in JASO-B408 (hereafter referred to as 25% hardness) of the material Q is softer than a 25% hardness of the material P,
    wherein the 25% hardness of the material Q is 50% to 98% of the 25% hardness of the material P, and
    in cross-section, the under-buttock section extends from a top surface of the seat cushion pad, upon which a user will sit, to a bottom surface of the seat cushion pad.

10. A seat for a vehicle comprising the seat cushion pad for a vehicle according to claim 9.

11. A seat cushion pad for a vehicle according to claim 9, wherein the density of material P is 40 to 80 kg/m³ and the density of material Q is 40% to 95% of the density of material P.

12. A seat back pad for a vehicle according to claim 9, wherein the 25% hardness of material P is 150 to 300 N.

13. A seat back pad for a vehicle, characterized in that a part of or entire sections except a backrest section comprise a material S having a density lower than the density of a material R constituting the backrest section,
    wherein a 25% hardness based on a hardness testing method specified in JASO-B408 of the material S is softer than a 25% hardness of the material R,
    wherein the 25% hardness of the material S is 50% to 98% of the 25% hardness of the material R, and
    in cross-section, the backrest section extends from a top surface of the seat back pad, which will contact the back of a user, to a bottom surface of the seat back pad.

14. A seat for a vehicle comprising the seat back pad for a vehicle according to claim 13.

15. A seat back pad for a vehicle according to claim 13, wherein the density of material R is 40 to 80 kg/m³ and the density of material S is 40% to 95% of the density of material R.

16. A seat back pad for a vehicle according to claim 13, wherein the 25% hardness of material R is 150 to 300 N.

* * * * *